No. 810,745. PATENTED JAN. 23, 1906.
H. GRONWALD.
METHOD OF PASTEURIZING BEER.
APPLICATION FILED AUG. 30, 1905.
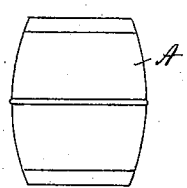
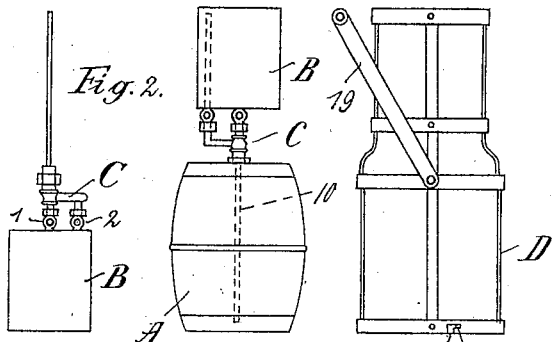
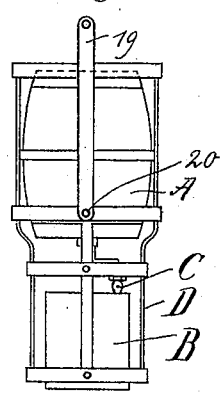
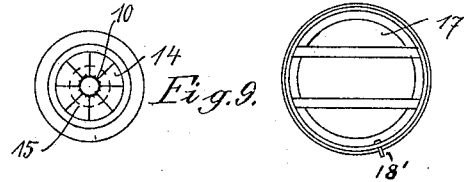
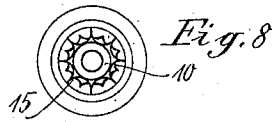
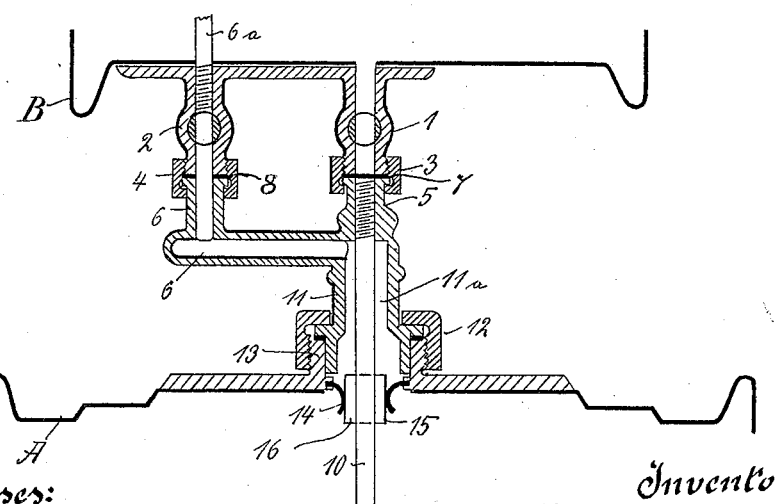
Witnesses:
Inventor
Hugo Gronwald.
by Attorneys

UNITED STATES PATENT OFFICE.

HUGO GRONWALD, OF BERLIN, GERMANY.

METHOD OF PASTEURIZING BEER.

No. 810,745. Specification of Letters Patent. Patented Jan. 23, 1906.

Application filed August 30, 1905. Serial No. 276,436.

*To all whom it may concern:*

Be it known that I, HUGO GRONWALD, of Berlin, in the Kingdom of Prussia, Germany, have invented a new and Improved Method of Pasteurizing Beer in Barrels, of which the following is a full, clear, and exact description.

The hitherto-known method of pasteurizing beer in the barrels in which it is to be transported had the disadvantage that when the barrels were provided with a separate expansion-chamber the natural carbonic acid contained in the beer was partly lost and the germs or barm at times contained in this chamber could not be killed, so that the beer frequently overflowing into this chamber was not entirely free from germs, while when the necessary space for expansion was provided by not filling the barrel completely it had to be filled up with beer from another source. These disadvantages are removed according to my improved method by dividing the quantity of beer required for completely filling the barrel between two connected vessels—namely, a lower detachable vessel, hereinafter called "receiver," equal in capacity to the required space for expansion and a barrel communicating with and arranged above this vessel in such a manner that the receiver is completely filled, while in the barrel an empty expansion-space is left equal to the capacity of the receiver. The beer is then pasteurized in the barrel and receiver and cooled in the usual way, after which the carbonic acid disengaged during the pasteurizing and which as risen into the expansion-space in the barrel can be returned without loss to the beer—for instance, by shaking the barrel. The pasteurizing apparatus being then turned upside down, the beer runs into the barrel from the receiver, while the excess of carbonic acid mounts into the receiver, so that by this simple exchange of the contents of the vessels a filling up of the beer-barrel from another source is rendered unnecessary and loss of carbonic acid is avoided.

Various apparatus or plant may be used for carrying out my said method, provided the barrel and receiver are connected into a combined apparatus.

On the drawings appended hereunto a form of apparatus suitable for carrying out the pasteurizing process in the manner described is shown as an example.

Figure 1 shows the barrel; Fig. 2, the receiver with the connecting-fittings C; Fig. 3, the combined pasteurizing apparatus; Fig. 4, a side view of a frame for sustaining the latter, and Fig. 5 a view of the same from below. Fig. 6 shows the frame with the pasteurizing apparatus in reversed position. Fig. 7 represents the two-way pipe-coupling between the barrel and receiver in section. Figs. 8 and 9 show a device for sealing the barrel when the coupling is disconnected.

The process is carried out in the following manner: The barrel A, Fig. 1, is completely filled with beer and then connected, by means of the fittings C, Fig. 2, to the receiver B, previously freed from air and completely filled with carbonic acid, so as to form a connected pasteurizing apparatus, Fig. 3. In the example of construction shown in Fig. 2 the connections consist of two cocks 1 2, fixed to the receiver in any suitable way, which are closed after the receiver has been filled with carbonic acid and connected, by means of unions 3 4, to the branches 5 and 6 of the two-way coupling, the joints being packed in any usual suitable manner—for instance, by means of washers 7 8, of fiber. Into the branch 5 a long pipe 10 is screwed, while the branch 6 communicates, through an elbow, with the annular space in the socket 11 and through the cock 2 with a pipe $6^a$, extending into the receiver. The socket 11 in turn is connected by a union cap 12 to the bung-hole rim 13 of the beer-barrel A. The combination of pipes 10, 11, 6, and $6^a$ serves alternately to exchange beer and carbonic acid. As the diameter of the socket 11 is larger than that of the pipe 10, provision must be made to exclude the access of air to the beer when the receiver is lifted off and the pipe 10 thereby withdrawn from the barrel. This closure may be effected, for instance, by a back-pressure valve. In the example of apparatus shown the closure is effected by means of an elastic disk 14 slit into sectoral flaps, which is fixed in groove of a metal rim formed on the lower part of the bung-hole rim 13. In order to permit beer and carbonic acid to pass into the socket 11, forming part of the two-way coupling, the pipe 10 is fitted below the union with a short tubular jacket 15, so as to leave an annular space 16 round the pipe. The tubular jacket is as long as the length of thread used in screwing the union cap 12 upon the bung-hole rim of the barrel. On unscrewing the union and lifting off the receiver the sectoral flaps of the elastic disk slide off the jacket 15, bear closely against the pipe 10, and close themselves self-actingly after it has been entirely drawn out. The pasteurizing apparatus provided with these fittings is then placed upon the bottom 17 of the frame D, the latter placed over the apparatus, and by means of a bayonet-slot 18, formed in the frame D, and a pin 18', carried by the bottom 17, or in any other convenient manner firmly connected to the bottom. By means of the lifting-tackle of a traveling crab the frame with the pasteurizing apparatus is then lifted by means of the links 19, Fig. 6, connected by a crossbar. In this position it is turned round the pivots 20, so that the barrel is now at the top and the receiver below, in consequence of which when the cocks 1 and 2 are now opened the barrel is emptied through the socket 11 and pipe 6ª by the quantity the receiver can contain, while at the same time the carbonic acid passes from the receiver into barrel through the pipe 10. In this position the apparatus is carried into the pasteurizing-stove and afterward into the cooling-reservoir. When sufficiently cooled, it is raised again and while hanging in the tackle is rocked on the pivots 20 in the frame in order to cause the carbonic acid disengaged during the pasteurizing to be reabsorbed by the cold beer. The apparatus is then placed upon the floor with the barrel turned downward. In this position the beer flows back from the receiver through the pipe 10 and again fills it completely, while the unabsorbed carbonic acid passes through the socket 11 and pipes 6 6ª into the receiver. After the frame has been removed the receiver is taken off the barrel by unscrewing the nut 12 and the barrel closed by means of the described closing-washer, Figs. 8 and 9, and a metal bung screwed onto the rim 13.

I claim—

1. An improved method of pasteurizing beer in the barrel in which it is to be transported, which consists in dividing the quantity of beer required to fill the barrel between the barrel and a receiver below the same and communicating with it through pipe connections, after having freed said vessels from air by means of carbonic acid, so that the receiver is filled completely and an empty space equal to its contents is left in the barrel in order that the carbonic acid disengaged from the beer in the barrel and receiver during the pasteurizing may collect in the barrel and after cooling be returned to the beer without loss by shaking or other known means, whereupon the pasteurizing apparatus is placed on the floor with the barrel at the bottom so that the receiver can empty itself into the barrel and the excess of carbonic acid mount into the receiver.

2. The method of pasteurizing beer consisting in filling a barrel with beer and a receiver with carbonic acid, connecting said barrel and receiver by means of a single coupling, then transferring the carbonic acid and a portion of the beer from the receiver into the barrel, then pasteurizing the beer and then retransferring the carbonic acid and beer respectively to the barrel and the receiver.

In witness whereof I have hereunto signed my name, this 14th day of August, 1905, in the presence of two subscribing witnesses.

HUGO GRONWALD.

Witnesses:
WOLDEMAR HAUPT.
HENRY HASPER.